Patented Apr. 8, 1947

2,418,499

UNITED STATES PATENT OFFICE 2,418,499

2 - ALKOXYMETHYLMERCAPTO - THIAZOLES AND THIAZOLINES AND A PROCESS FOR PREPARING THE SAME

William James Burke, Marshallton, Del., assignor to E. I. du Pont de Nemours & Company, Wilmington, Del., a corporation of Delaware No Drawing. Application June 20, 1944, Serial No. 541,276

13 Claims. (Cl. 260—302)

This invention relates to new sulfur-containing compounds. More particularly, it relates to new thioethers and to a process for preparing them.

An object of this invention is to provide a new class of compounds, the thioethers of the general formula R—S—CH$_2$—O—R' wherein R is a heterocyclic radical, preferably a thiaza-cycloalkyl radical, and R' is an alkyl radical. R is also preferably a heterocyclic compound wherein the heterocyclic ring has one sulfur, one nitrogen and three carbons in the thiazole or thiazoline configuration. Another object is to provide a process for preparing mixed oxygen-sulfur formulas containing the radical —C—S—CH$_2$—O—alkyl. A further object is the preparation of 2-alkoxymethylmercaptothiazolines.

These objects are accomplished, in accordance with the invention, by reacting a thiol having the thiol group attached to carbon in a heterocyclic ring, preferably a thiaza-cyclic ring, with formaldehyde and an alkanol in the presence of an acidic catalyst and isolating the mixed oxygen-sulfur formal so obtained.

The reaction which takes place is represented by the equation:

R—SH+CH$_2$O+R'OH→
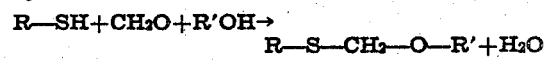
R—S—CH$_2$—O—R'+H$_2$O

The more detailed practice of the invention is illustrated by the following examples, wherein parts given are by weight. There are, of course, many forms of the invention other than these specific embodiments.

Example I

A solution prepared by dissolving 15 parts (0.5 mole) of paraformaldehyde in 32 parts (1 mole) of methanol containing 0.025 part of potassium hydroxide (the latter being used to depolymerize the paraformaldehyde) is added with stirring to a suspension of 59.5 parts (0.5 mole) of 2-mercaptothiazoline in 64 parts (2 moles) of methanol. The reaction mixture soon becomes clear upon slight warming. After 30 minutes, there is added sufficient p-toluenesulfonic acid for neutralization and 0.1 part in excess, and the reaction mixture is allowed to stand at room temperature for 24 hours. The excess methanol is then removed under reduced pressure, the residue is dissolved in chloroform, washed with aqueous sodium bicarbonate and dried over sodium sulfate. The is obtained, on removal of the chloroform by distillation, 73 parts (yield: 90% of the theory) of a light colored liquid which, on distillation, gives a practically colorless material boiling at 140° C.

at 2 mm. pressure. Upon cooling, the product solidifies to a soft, white, crystalline solid melting at 41° C. This compound is 2-methoxymethylmercaptothiazoline, having the formula

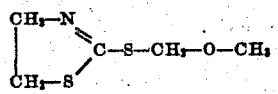

It is slightly soluble in water and readily soluble in alcohol, dioxan and chlorinated hydrocarbons.

Analysis: Calculated for C$_5$H$_9$ONS$_2$: S, 39.25%. Found: S, 39.46%; 39.27%.

Example II

A mixture of 36 parts (1.2 moles) of paraformaldehyde, 64 parts (2 moles) of methanol and 0.5 part of 10% potassium hydroxide in methanol is warmed gently, and to the resulting solution is added 119 parts (1 mole) of 2-mercaptothiazoline. The mixture is heated and stirred at 65° C. for 1 hour, then allowed to stand for two hours at room temperature, after which one part of p-toluenesulfonic acid in 16 parts (0.5 mole) of methanol is added and the solution is heated at 65° C. for two hours. The reaction mixture is cooled to room temperature and 200 parts of a 10% solution of sodium hydroxide in 80/20 methanol-water is added with stirring. There is then added 400 parts of benzene, the benzene solution is washed free of alkali with water and dried over sodium sulfate. The residue (105 parts, 65% yield) left after distilling off the solvent crystallizes on standing. The product is 2-methoxymethylmercaptothiazoline melting at 41° C.

In the process of this invention other heterocyclic thiols, such as 2-mercaptobenzothiazole, 2-mercapto-4-methylthiazole, 2-mercapto-4-ethylthiazoline, 2 - mercapto-4,4-dimethylthiazoline, etc., may be condensed with formaldehyde and methanol or other alkanols, preferably lower alkanols of one to four carbon atoms, e. g., ethanol, propanol, butanol, etc. Compounds having a five membered heterocyclic ring having three carbons, one nitrogen and one sulfur are preferred as are also thiaza-cycloalkyl radicals. Formaldehyde itself or its polymers such as paraformaldehyde may be used. A substantially anhydrous source of formaldehyde is preferred since this favors a higher yield of the desired product. Instead of using a thiol and formaldehyde separately, the preformed S-hydroxymethyl compound, e. g., 2-hydroxymethylmercaptothiazoline, may be condensed with an alcohol in the presence of an acidic catalyst.

As catalysts, there may be mentioned aromatic sulfonic acids, hydrochloric acid, phosphoric acid, sulfuric acid or other strong mineral or organic acids. In general, there is used from 0.05 to 5% of catalyst based on the weight of the formaldehyde. The reaction may be carried out at any temperature short of the decomposition point of the reactants or products. In practice, a temperature of 15–150° C. is preferred. The reaction time depends in part on the temperature and may vary from 15 minutes to 24 hours or longer.

In general there should be used at least one mole of alcohol per mole of thiol. Preferably, there is used an excess of alcohol since this is usually the cheaper reagent. Furthermore, an excess of alcohol tends to increase the yield of the desired product. Preferably, there is used at least one mole of formaldehyde per mole of thiol.

This invention contemplates as new products the mixed oxygen-sulfur formals of the formula R—S—CH$_2$—O—R' wherein R is a heterocyclic radical having its free valence stemming from a carbon of the heterocyclic ring and R' is an alkyl radical. Preferably, R is a thiaza-cyclic radical, desirably a thiazolinyl radical. These products are useful as modifying agents for hydroxylated polymers. For example cellulose acetate (having free hydroxyl groups), when heated with 2-methoxymethylmercaptothiazoline and p-toluenesulfonic acid as catalyst, shows markedly increased resistance to organic solvents, increased dimensional stability and improved water-resistance. The products of this invention are also of interest as pesticides, rubber chemicals and lubricant addition agents.

The above description and examples are intended to be illustrative only. Any modification thereof or variation therefrom which conforms to the spirit of the invention is intended to be included within the scope of the claims.

What is claimed is:

1. 2-methoxymethylmercaptothiazoline.
2. 2-alkoxymethylmercaptothiazolines.
3. A heterocyclic compound having a methoxymethylthio radical attached to the 2-carbon atom of a five membered ring said ring being selected from the group consisting of the thiazole ring and the thiazoline ring.
4. A heterocyclic compound having an alkoxymethylthio radical attached to the 2-carbon atom of a five membered ring said ring being selected from the group consisting of the thiazole ring and the thiazoline ring.
5. A heterocyclic compound having a methoxymethylthio radical attached to the 2-carbon atom of a thiazoline ring.
6. A heterocyclic compound having an alkoxymethylthio radical attached to the 2-carbon atom of a thiazoline ring.
7. Process for preparing 2-methoxymethylmercaptothiazoline which comprises reacting one mole mercaptothiazoline with at least one mole each of formaldehyde and methanol in the presence of p-toluenesulfonic acid as a catalyst.
8. Process for preparing 2-methoxymethylmercaptothiazoline which comprises reacting mercaptothiazoline with formaldehyde and methanol in the presence of an acidic catalyst.
9. Process for preparing a 2-alkoxymethylmercaptothiazoline which comprises reacting mercaptothiazoline with formaldehyde and a lower alkanol in the presence of an acidic catalyst.
10. Process for preparing a 2-alkoxymethylmercaptothiazoline which comprises reacting mercaptothiazoline with formaldehyde and an alkanol in the presence of an acidic catalyst.
11. Process for preparing new heterocyclic compounds which comprises reacting, in the presence of an acidic catalyst, formaldehyde and methanol with a heterocyclic compound having a thiol group attached to the 2-carbon of a five-membered ring selected from the group consisting of the thiazole ring and the thiazoline ring.
12. Process for preparing new heterocyclic compounds which comprises reacting, in the presence of an acidic catalyst, formaldehyde and an alkanol with a heterocyclic compound having a thiol group attached to the 2-carbon of a five-membered ring selected from the group consisting of the thiazole ring and the thiazoline ring.
13. Process for preparing new heterocyclic compounds which comprises reacting, in the presence of an acidic catalyst, formaldehyde and an alkanol with a heterocyclic compound having a thiol group attached to the 2-carbon atom of a thiazoline ring.

WILLIAM JAMES BURKE.

REFERENCES CITED

The following references are of record in the file of this patent:

UNITED STATES PATENTS

| Number | Name | Date |
|---|---|---|
| 2,107,366 | Bruson | Feb. 8, 1938 |
| 2,280,792 | Bruson | Apr. 28, 1942 |
| 2,092,712 | Clifford | Sept. 7, 1937 |
| 2,134,957 | Sebrell | Nov. 1, 1938 |
| 2,070,523 | Clifford | Feb. 9, 1937 |
| 2,040,467 | Clifford | May 12, 1936 |
| 2,248,356 | Jones | July 8, 1941 |

OTHER REFERENCES

Darrer, Organic Chemistry (1938), page 103.